United States Patent [19]

Nicholson

[11] Patent Number: 5,558,347
[45] Date of Patent: Sep. 24, 1996

[54] SEAL

[75] Inventor: Terence P. Nicholson, Hexham, Great Britain

[73] Assignee: Specialist Sealing Limited, Jersey, Channel Islands

[21] Appl. No.: 427,881

[22] Filed: Apr. 26, 1995

Related U.S. Application Data

[63] Continuation of Ser. No. 81,266, filed as PCT/GB91/02327, Dec. 30, 1990, published as WO92/12365, Jul. 23, 1992, abandoned.

[30] Foreign Application Priority Data

Dec. 31, 1990 [GB] United Kingdom ................... 9028219
Jan. 21, 1991 [GB] United Kingdom ................... 9101301

[51] Int. Cl.⁶ ........................................................ F16J 15/00
[52] U.S. Cl. .................... 277/229; 277/207 R; 277/213; 277/235 R; 277/235 A
[58] Field of Search ............................ 277/207 R, 207 A, 277/211, 213, 215, 235 B, 236, 34, 34.3, 209, 229, 233, 235 R, 235 A

[56] References Cited

U.S. PATENT DOCUMENTS

| 1,160,316 | 11/1915 | Paterson | 277/235 B |
|---|---|---|---|
| 1,731,404 | 10/1929 | Wetherill | 277/207 |
| 2,156,662 | 5/1939 | Wills | 277/235 B |
| 2,580,546 | 1/1952 | Hobson, Jr. | |
| 2,888,540 | 3/1954 | Gratzmuller | 200/151 |
| 3,332,566 | 7/1967 | Phillips | 277/213 |
| 3,817,540 | 6/1974 | Nicholson | 277/236 |
| 4,451,051 | 5/1984 | Nicholson | 277/236 |
| 4,711,456 | 12/1987 | Udagawa | 277/235 B |
| 4,795,174 | 1/1989 | Whitlow | 277/213 |
| 4,948,153 | 8/1990 | Takahashi | 277/236 |

FOREIGN PATENT DOCUMENTS

| 2220536 | 4/1972 | Germany | F16J 15/06 |
|---|---|---|---|
| 2828475 | 1/1980 | Germany | F16J 15/12 |
| 3720224 | 1/1989 | Germany | F16J 15/12 |
| 0285644 | 11/1989 | Japan | 277/235 B |
| 1213454 | 11/1970 | United Kingdom | F16J 15/06 |
| 1273136 | 5/1972 | United Kingdom | F16J 15/06 |
| 1527344 | 10/1978 | United Kingdom | F16J 15/08 |
| 2097872 | 4/1985 | United Kingdom | F16J 15/08 |
| 2229047 | 9/1990 | United Kingdom . | |
| 2210939 | 5/1991 | United Kingdom . | |
| 2246822 | 2/1992 | United Kingdom | F16J 15/12 |
| WO8903491 | 4/1989 | WIPO | F16J 15/06 |

*Primary Examiner*—Daniel G. DePumpo
*Attorney, Agent, or Firm*—Ohlandt, Greeley, Ruggiero & Perle

[57] ABSTRACT

A static seal comprising an envelope of chemically resistant PTFE and a metallic packing ring within the envelope shaped to form cells. The cells may be filled with an inert gas under pressure so that increased loads on the seal may be cushioned.

7 Claims, 2 Drawing Sheets

SEAL

This is a continuation of Ser. No. 08/081,266, filed Jun. 23, 1993, now abandoned, which is a 371 of PCT/GB91/02327, Dec. 30, 1990, published as WO92/12365, Jul. 23, 1992.

BACKGROUND OF THE INVENTION

This invention relates to flexible seals, of the kind comprising an envelope and a packing in the envelope. The invention has particular but not exclusive application to static seals for glass-lined vessels, for example pressure vessels.

A problem which arises in the sealing of pipes and vessels, is that the flange surfaces or other sealing surfaces are often less than perfectly flat.

This problem is particularly serious in the case of glass-lined vessels, which commonly have flange surfaces out of flatness both circumferentially and radially. Distortion of the flange surfaces occurs when the glass powder that has been sprayed onto the vessel surfaces is fused, the fusing temperature being in the region of 750° C.

In a glass-lined vessel, apertures may need to be sealed over a range of sizes from 1 inch (25 millimeters) diameter to 7 feet (213 centimeters). The required seal thickness may vary from 1/16th of an inch to 1/2 inch (1.5 to 12.7 mm).

In the past, seals have commonly contained asbestos, and have been inefficient and have required considerable amounts of time for installation and replacement.

An object of the present invention is to provide a flexible seal, suitable for sealing glass-lined vessels and in other circumstances where sealing surfaces are not perfectly flat, which seal will not contain any asbestos or other harmful materials, and will provide high seal efficiency, reduced seal assembly time, and a substantial decrease in down-time of the equipment involved.

Our British Patent Application No. 9017173.7 filed 6th Aug. 1990 disclosure seals capable of achieving these objects, for thicker seals, typically 4.7 mm or more thick. The seal proposed in the aforesaid application comprises an envelope, and a packing within the envelope, the packing comprising a plurality of adjacent turns of strip material, arranged with the width direction of the strip extending generally perpendicular to the sealing faces of the seal, the strip material being resilient and having apertures extending through it, distributed along the strip length, whereby the strip is resilient in the direction of its width.

In a preferred embodiment, the strip material is stainless steel or other suitable metal and the envelope is PTFE.

A specific object of the present invention is to provide a seal capable of overcoming the shortcomings of conventional seals and achieving the above-mentioned objects, in a small seal thickness, typically 4 mm thick or less.

SUMMARY OF THE INVENTION

According to the present invention, a flexible seal comprises an envelope, and a packing within the envelope, the packing comprising a cellular structure formed of sheet or strip material. The packing is preferably of metal sheet. However other materials can be used, including non-metallic sheet materials for the packing.

The material of which the packing is formed must be relatively strong but resilient, in order to resist applied sealing stresses while yielding flexibly to these and maintaining sealing pressure.

The packing may comprise closed cells filled with a fluid, in particular a gas under pressure. In this case, the strength and resilience of the packing may be enhanced by the filling and accordingly the strength of the material of the packing itself might be reduced, even to the extent that the packing comprises essentially a flexible envelope containing a pressurized gas or other fluid within cells formed by the envelope.

In general, the packing will present peaks and troughs in order to accommodate lack of flatness in the surfaces to be sealed, with an optimum combination of strength and compensation for lack of flatness.

Preferably the packing is composed of one or more sheets or layers of metal lying generally in a plane perpendicular or transverse to the direction in which a sealing or clamping force is applied to the seal, and shaped or deformed to form cells.

In one embodiment of the invention, the packing comprises one of more layers of corrugated or embossed or otherwise deformed sheet or strip material, with the sheet or strip laying generally in a plane perpendicular to the axis of the seal (in the case of a seal ring) or perpendicular to the direction of the applied sealing pressure, and with the corrugations, embossments or other deformations projecting in the axial direction or in the direction of the applied pressure.

Preferably, the corrugations, embossments or other deformations form closed cells, in particular, by a provision of two or more superposed layers of which at least one is deformed. There may be provided, for example, two layers each of which is deformed, one being a mirror image of the other so the respective deformed regions are in register and form closed cells.

Optionally, a further layer may be interposed between two deformed layers. The interposed layer is preferably attached to one or both of the other layers, for example by spot welding or by adhesive bonding.

The seal may contain an inert gas, for example argon or nitrogen, in particular within the aforesaid closed cells. Filling the sealing structure with an inert gas under pressure enables the seal to cater better to unusual circumstances and difficult applications.

The present invention in another aspect provides a flexible seal comprising a flexible protective envelope and a deformable packing within the envelope, the packing comprising at least one layer of stiffly resilient sheet material presenting at least one peak and trough within the envelope.

The invention in yet another aspect provides a flexible seal comprising a flexible protective envelope and a deformable packing within the envelope, the packing comprising at least one layer of stiffly resilient sheet material of corrugated form.

The invention further provides a flexible seal comprising a flexible protective envelope and a deformable packing within the envelope, the packing comprising at least one layer of stiffly resilient sheet

BRIEF DESCRIPTION OF THE DRAWINGS

The present invention will be further described with reference to the accompanying drawings in which.

DESCRIPTION OF PREFERRED EMBODIMENTS

Figure 1:
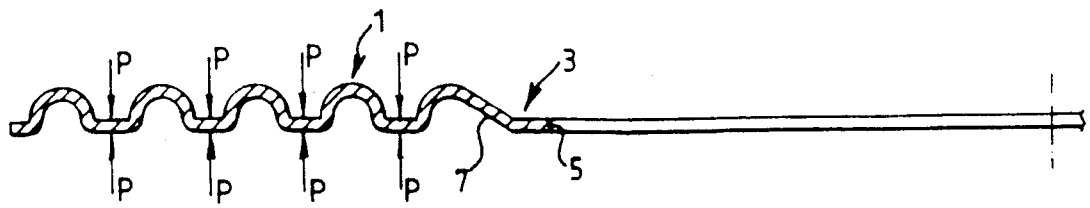
FIG. 1 is a radial cross section of an individual metal packing ring.

In the manufacture of seal ring packings embodying the present invention, metal rings are machined or stamped from sheet metal of predetermined thickness and quality suitable for the desired application. Annular corrugations are provided in the rings, either in the course of the machining or stamping, or by a separate stamping or embossing step. FIG. 1 illustrates one form of spherical or arcuate annular corrugations 1 embossed in a sheet metal ring 3 which has a central aperture 5. The corrugations are all embossed so as to project axially on one and the same side of the initial plane of the ring. The radially innermost corrugation has a sloping transition 7 at its radially inner side, in contrast to the substantially circular arcuate profiles of the other corrugations and of the radially outer portion of the innermost corrugation.

Figure 2:
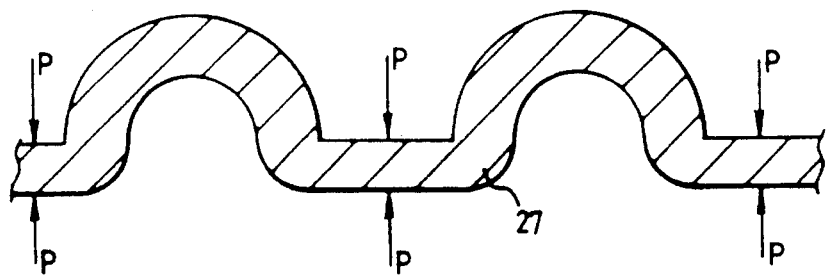
FIG. 2 shows a detail of the ring on a larger scale.

It will be seen particularly from FIG. 2 that each corrugation is substantially semi-circular in radial cross-section, joining the un-deformed planar regions 25 of the ring at relatively sharp shoulders 27.

Figure 3:
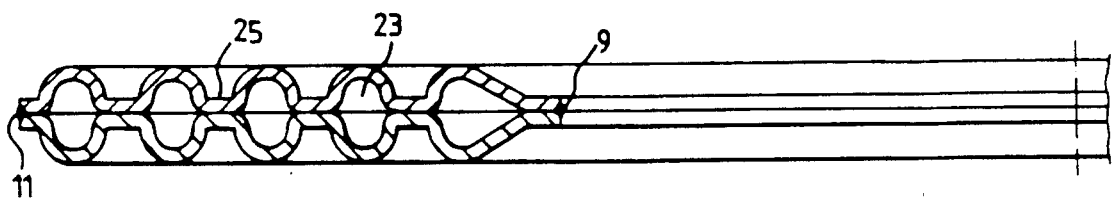
FIG. 3 shows a pair of such rings placed back to back.

Such a ring can be used singly as the packing within a protective envelope, e.g. of plastics material, but in order to increase the strength of the seal, it is preferred that a pair of packing rings, which are mirror images of one another in the axial direction, be placed back to back with their respective corrugations in register, as shown in FIG. 3, thereby defining closed annular cells 23 between the sheet metal rings.

Figure 4:
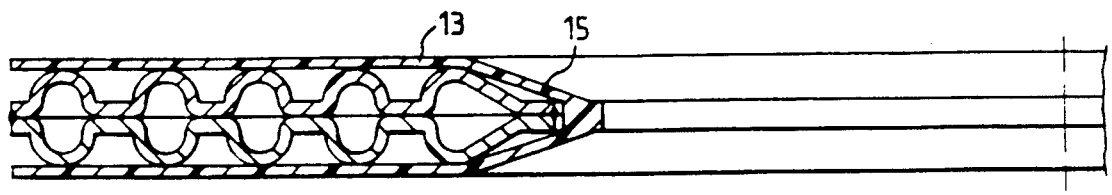
FIG. 4 shows the pair of rings in an envelope of the slit type.

In order to increase the support area when the rings are placed back to back, the metal of the ring in the regions 25 between the corrugations is preferably reduced in thickness. This increases the contact surface between the two rings and substantially eliminates any possibility of one ring slipping off the other when the seal is axially compressed. The taper of the innermost corrugation region 7 is provided in order to give support to an envelope 13 of the conventional slit type, that is to say an envelope formed by slitting an annular block or sheet of PTFE or other envelope material, producing a V- or Y-configuration at the radially inner region of the envelope, as can be seen in FIG. 4.

As shown in FIG. 3, the two metal packing ring pressings are placed back to back and are fitted, in this manner, into a welding jig, in which they are fusion welded at 9, 11, around the inner and outer diameters of the rings, to form a unitary packing structure. If desired, the structure (that is to say the annular cells 23 formed by the corrugations) can be filled with an inert gas such as argon or nitrogen under pressure, at this stage.

The packing structure is then provided with an envelope, of PTFE or other suitable material. The envelope provides the actual seal against the flanges or other surfaces to be sealed, and also resists attack from the contents of vessels or pipelines sealed by the seal, while the packing provides mechanical strength and resilience. FIG. 4 shows the cellular packing structure fitted into the conventional slit-type PTFE envelope 13. As mentioned above, the sloping inner regions 7 of the packing provide support for the V-section inner region 15 of the envelope.

Figure 5:
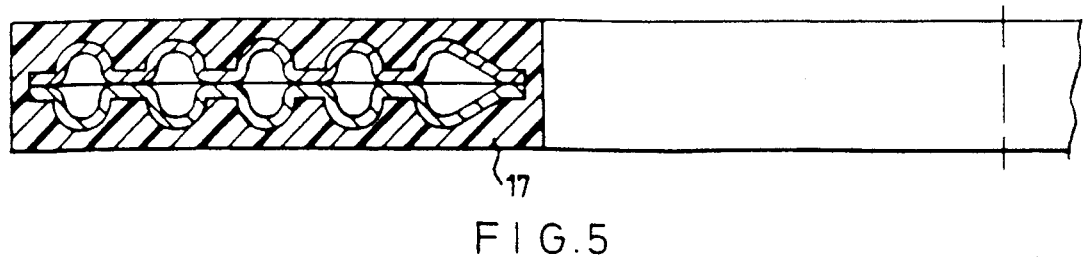
FIG. 5 shows a similar pair of rings in a sealed envelope.

Alternatively, if a seal of greater integrity is required, the packing can be encased in PTFE by moulding or bonding, as shown in FIG. 5 which illustrates the metal packing structure encapsulated in an annular block 17 of envelope material.

A further possibility is to place the packing structure within an envelope formed by machining a radial channel in an annular block of envelope material, the channel being open radially outwardly.

Figure 6:
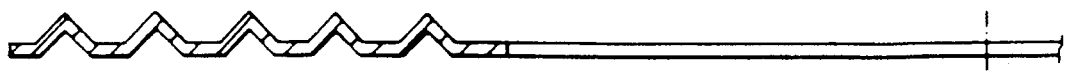
FIGS. 6 and 7 show alternative packing ring shapes.
Figure 7:

It is believed that corrugations or other deformations of arcuate cross-section are preferable, not least because they will lead to relatively low local stresses in the packing and to a good distribution of the sealing pressure. However, deformations of other form can be used, for example corrugations of triangular or saw-tooth cross-section as shown in FIG. 6, or of trapezium cross-section as shown in FIG. 7.

The illustrated embodiments have annular corrugations. However the packing may alternatively have more localised deformations, that is to say deformations which do not each extend through 360° about the axis of the seal. Thus, for example, the deformations may consist of a plurality of dimples. If a pair of dimpled packing rings is used back to back, the respective dimples of the rings may, or may not, be in register with one another; in either case the dimples will form closed cells.

The operational characteristics of the illustrated seals, in particular using the packing structure shown in FIG. 3, are excellent. In effect, the packing structure of FIG. 3 can be regarded as a plurality of interconnected annular tubes or hollow rings. These can adjust circumferentially and radially to substantially any likely variation in flatness of the mating faces to be sealed.

As already mentioned, the packing structure may be filled with an inert gas under pressure. This enables the seal to cater for unusual circumstances such as:

a) extreme out of flatness, where it is necessary to use an insert of the greatest thickness, e.g. 4 mm, yet at the same time use metal rings of reduced thickness so that the compression loads are not abnormal. In such cases when the rings are gas filled the load can be increased but at the same time the load is cushioned;

b) for more exotic application such as the sealing of high tech pressure seals where loads are to the absolute minimum;

c) the sealing of extremely high vacuum equipment such as electron accelerators.

In brief, the present seals can be designed to suit an extremely broad range of design criteria, i.e. to meet most design standards by simply adjusting the height and pitch of the corrugations in relation to the thickness and specification of the metal and to operational requirements.

Figure 8:
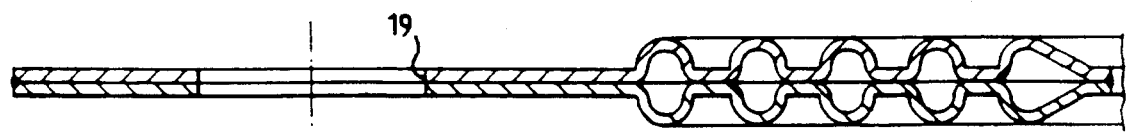
FIG. 8 shows a metal packing for full-face sealing.

These present seals can be supplied to fit in spigot and recess joints, inside bolt centres, or full face. For full face applications, the outside of the metal packing ring is extended to the full diameter of the flange to be sealed, and the corrugations are embossed to within a short distance of the clamping bolt holes 19. If desired the plates may be seam welded around the outside of the corrugations as well as being fusion welded around both the inner and outer diameters; see FIG. 8.

For use at high temperatures, the metal plate or plates forming the packing may be coated with expanded graphite, or expanded graphite may fill the troughs of the undulations, optionally on both faces of the packing especially in the twin-plate embodiments such as those shown in FIGS. 3 to 5, FIG. 8 and FIG. 9. The measure has been found to provide a seal which operates very successfully in extreme conditions.

Figure 9:
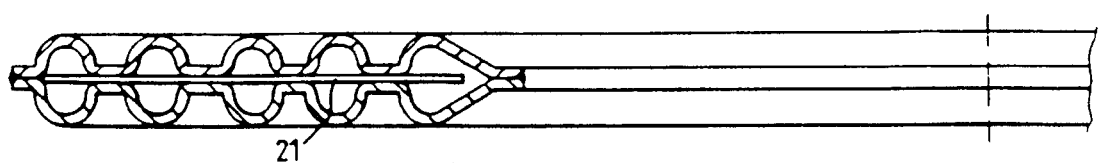
FIG. 9 shows a modification of the packing shown in FIG. 3.

FIG. 9 shows a packing composed of three metal plates, namely a pair of plates with corrugations as shown in FIG. 3, and an interposed third plate 21 of flat sheet metal, sandwiched between the corrugated regions of the outer plates.

This interposed additional plate can provide even greater flexibility to the seal, for unusual or stressful applications.

If the packing is to be gas-filled, as mentioned above, the interposed flat plate is preferably perforated so as to allow communication between the corrugations of the respective outer plates. It will be observed that in FIG. 9 the radially innermost edge of the interposed plate 21 terminates short of the radially innermost boundary of the innermost corrugations 7.

The interposed plate can be loose (in the sense that it is not attached to the corrugated outer plate), but preferably it is located in position for example by being attached to one or both of the outer plates, for example by spot welding or adhesive bonding.

I claim:

1. A flexible seal comprising a flexible impervious protective and sealing envelope having substantially parallel spaced-apart portions, said envelope being formed of a chemically resistant plastic material, and a resiliently deformable packing within the envelope, the packing comprising a resilient cellular structure consisting of two superposed layers of resilient sheet metal generally parallel to and between said portion, of which at least one said layer is deformed and sealed to the other said layer in such a way that at least one closed cell is formed between said sealed layers; whereby said closed cell is capable of retaining a fluid or gas therein.

2. A seal as claimed in claim 1 in which said closed cell is annular.

3. A flexible seal comprising a flexible impervious protective and sealing envelope having substantially parallel spaced-apart portions, said envelope being formed of a chemically resistant plastic material, and a resiliently deformable packing within the envelope, the packing comprising a resilient cellular structure consisting of two superposed layers of resilient sheet metal generally parallel to and between said portion and a further layer of a perforated flat sheet material which is interposed between said two superposed layers, of which at least one said superposed layer is deformed and sealed to the other superposed layer in such a way that at least one closed cell is formed between said two superposed layers wherein the perforations in said flat sheet material permit fluid and gaseous communications between said two superposed layers, whereby said closed cell is capable of retaining a fluid or gas therein.

4. A seal ring for pressure vessels which comprises:

an annular flexible impervious protective and sealing envelope, having axially spaced portions and an internal circumferential region interconnecting said axially spaced portions, said envelope being formed of a chemically resistant plastic material; and a resiliently deformable packing disposed within said envelope between said spaced portions and providing mechanical support therefor, said resiliently deformable packing consisting of superposed and interconnected first and second layers of resilient sheet metal, each deformed and sealed to the other said layer in such a way as to provide, in radial cross-section, alternating flat and raised deformed regions, the radial cross-sections of said sheets being mirror images of one another whereby the deformed regions of each sheet lie opposite corresponding deformed regions of the other sheet, the deformed regions forming closed cells between the sealed layers, the radially innermost deformed region of each said sheet defining a tapered profile in cross-section, said sheets being interconnected along inner and outer circumferential lines.

5. A flexible seal comprising a flexible impervious protective and sealing envelope having substantially parallel spaced-apart portions, said envelope being formed of a chemically resistant plastic material, and a resiliently deformable packing within the envelope, the packing comprising a resilient cellular structure comprising at least two superposed layers of resilient sheet metal generally parallel to and between said portions, of which at least one said layer is deformed and sealed to the other said layer in such a way that at least one closed cell is formed between said layers, said sheet metal is of reduced thickness, in the regions of said layer which are deformed.

6. A seal ring for pressure vessels which comprises:

an annular flexible impervious protective and sealing envelope, having axially spaced portions and an internal circumferential region interconnecting said axially spaced portions, said envelope being formed of a chemically resistant plastic material; and a resiliently deformable packing disposed within said envelope between said spaced portions and providing mechanical support therefor, said resiliently deformable packing comprising superposed and interconnected first and second layers of resilient sheet metal, each deformed to provide, in radial cross-section, alternating flat and raised deformed regions, the radial cross-sections of said sheets being mirror images of one another whereby the deformed regions of each sheet lie opposite corresponding deformed regions of the other sheet, the deformed regions forming closed cells between the sealed layers, the radially innermost deformed region of each said sheet defining a tapered profile in cross-section, said sheets being interconnected along inner and outer circumferential lines, said sheet metal is of reduced thickness, in regions between said deformed regions.

7. A flexible seal comprising a flexible impervious protective and sealing envelope having substantially parallel spaced-apart portions, said envelope being formed of a chemically resistant plastic material, and a resiliently deformable packing within the envelope, the packing comprising a resilient cellular structure comprising two or more superposed layers of resilient sheet metal sheets each of which is deformed, placed back to back with their respective deformed regions, forming closed cells between the sealed layers, wherein an additional flat sheet material layer is interposed between the two deformed regions, wherein said deformed regions of said two superposed resilient sheet metal sheets are directly opposite one another and said additional flat sheet material layer is perforated at positions lying between said respective deformed regions for providing fluid communication between said regions.

\* \* \* \* \*